(12) United States Patent
Song et al.

(10) Patent No.: US 10,302,989 B2
(45) Date of Patent: May 28, 2019

(54) METHOD FOR IMPROVING TRANSMITTANCE OF FLAT OR CURVED LIQUID CRYSTAL DISPLAY PANEL

(71) Applicant: Shenzhen China Star Optoelectronics Technology Co., Ltd., Shenzhen, Guangdong (CN)

(72) Inventors: Yanjun Song, Guangdong (CN); Xiang Li, Guangdong (CN); Chung Ching Hsieh, Guangdong (CN); Chung Yi Chiu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/500,206

(22) PCT Filed: Jan. 20, 2017

(86) PCT No.: PCT/CN2017/071788
§ 371 (c)(1),
(2) Date: Apr. 13, 2018

(87) PCT Pub. No.: WO2018/120343
PCT Pub. Date: Jul. 5, 2018

(65) Prior Publication Data
US 2018/0217437 A1    Aug. 2, 2018

(30) Foreign Application Priority Data
Dec. 30, 2016   (CN) .......................... 2016 1 1258212

(51) Int. Cl.
*G02F 1/1333*    (2006.01)
*G02F 1/1335*    (2006.01)
(Continued)

(52) U.S. Cl.
CPC .... *G02F 1/133512* (2013.01); *G02F 1/13394* (2013.01); *G02F 1/133377* (2013.01);
(Continued)

(58) Field of Classification Search
None
See application file for complete search history.

(56) References Cited

U.S. PATENT DOCUMENTS

2017/0277000 A1*  9/2017  Shi ..................... G02F 1/133553
2018/0217437 A1*  8/2018  Song ................. G02F 1/133377

* cited by examiner

*Primary Examiner* — Thien F Tran

(57) ABSTRACT

Disclosed is a method for improving transmittance of flat or curved liquid crystal display panel. The method includes the following steps. (1) A substrate is manufactured according to the BPS technology. The substrate includes an array substrate and a CF substrate. A spacer and a black matrix are provided on a side of the array substrate and a transparent conductive electrode film is provided on a side of the CF substrate. (2) Marks are engraved on designated positions of the CF substrate by means of a laser and the CF substrate is aligned with the marks on a platform of a UV2A exposure machine. (3) Tracking lines are engraved on the transparent conductive electrode film and a region bounded by the tracking lines is aligned with a light-shielding region of a gate line or a light-shielding region of a data line on the side of the array substrate. (4) The substrate is exposed to light and a mask is used to track the tracking lines. The method, by taking advantage of a laser patterning method, overcomes the technical prejudices and enables the BPS technology to be compatible with the UV2A technology. Besides, a satisfactory transmittance can also be obtained through the method.

10 Claims, 5 Drawing Sheets

(51) Int. Cl.
*G02F 1/1337* (2006.01)
*G02F 1/1339* (2006.01)
*G02F 1/1362* (2006.01)

(52) U.S. Cl.
CPC .. *G02F 1/133753* (2013.01); *G02F 1/136209* (2013.01); *G02F 2001/13398* (2013.01); *G02F 2001/133354* (2013.01)

METHOD FOR IMPROVING TRANSMITTANCE OF FLAT OR CURVED LIQUID CRYSTAL DISPLAY PANEL

CROSS-REFERENCE TO RELATED APPLICATIONS

The present application claims the priority of Chinese patent application CN 201611258212.5, entitled "Method for improving transmittance of flat or curved liquid crystal display panel" and filed on Dec. 30, 2016, the entirety of which is incorporated herein by reference.

FIELD OF THE INVENTION

The present disclosure relates to the technical field of liquid crystal manufacturing, and in particular, to a method for improving transmittance of flat or curved liquid crystal display panel.

BACKGROUND OF THE INVENTION

As the liquid crystal display technology develops, a curved surface screen has been invented. For consideration of a curved surface design, a BPS (Black Photo Spacer) design is usually adopted to omit the manufacturing process of a BM (Black Matrix), because a BPS not only has a supporting function like a PS (Photo Spacer), but also can shield a frame area from light, i.e. a BM and a PS are manufactured in one process. Besides, the BPS is designed on an array substrate, and to be specific, the BPS is provided on a lower substrate, which can avoid undesirable optical characteristics caused by misalignment of an upper substrate and a lower substrate. However, a BPS design is not compatible with the UV2A (Ultraviolet Vertical Alignment) technology, the reason of which is briefly explained below.

The UV2A technology is a method for liquid crystal vertical alignment, the principle of which is as below. Ultraviolet passes through a mask and irradiates different regions of a pixel, causing a photochemical reaction on a PI (Polyimide) film. Then after liquid crystals are dispensed, alignment of liquid crystals at a certain angle is achieved. Compared with PSVA (Polymer Stabilized Vertical Alignment), UV2A has advantages like a higher liquid crystal efficiency, a lower cost, etc.

As shown in FIG. 1A and FIG. 1B, during the UV2A process, a mask 1 is needed. Considering that different regions of a pixel need to be exposed, during the process of exposure and translation, the mask 1 should be aligned with and be used to track a specified pattern in a panel 2, so as to ensure precision. For an ordinary substrate, a BM 3 or RGB (Red, Green, and Blue) color resists are provided on a side of a CF (color filter) substrate, and the mask 1 might be required to be aligned with and be used to track the BM 3 or the RGB patterns.

As shown in FIG. 2A and FIG. 2B, when the BPS technology is used, only an ITO (Indium Tin Oxide) transparent electrode layer is provided on a side of a CF substrate, no PS or BM being provided. Thus, no pattern can be tracked and exposed as the UV2A technology requires. Therefore, the BPS technology is not compatible with the UV2A technology, due to which it is unlikely to benefit from advantages of the two technologies simultaneously.

In view of the above, the present disclosure provides a method for improving transmittance of flat or curved liquid crystal display panel. The method is able to make the BPS technology be compatible with the UV2A technology, thanks to which a better liquid crystal display transmittance can be obtained.

SUMMARY OF THE INVENTION

The present disclosure aims to provide a method for improving transmittance of flat or curved liquid crystal display panel, through which the BPS technology is enabled to be compatible with the UV2A technology and a better liquid crystal display transmittance can be obtained.

To achieve the above object, the present disclosure provides a method for improving transmittance of flat or curved liquid crystal display panel. The method comprises the following steps.

(1) A substrate is manufactured according to the BPS technology. The substrate comprises an array substrate and a CF substrate. A spacer and a BM are provided on a side of the array substrate and a transparent conductive electrode film is provided on a side of the CF substrate. (2) Marks are engraved on designated positions of the CF substrate by means of a laser and the CF substrate is aligned with the marks on a platform of a UV2A exposure machine. (3) Tracking lines are engraved on the transparent conductive electrode film and a region bounded by the tracking lines is aligned with a light-shielding region of a gate line or a light-shielding region of a data line on the side of the array substrate. (4) The substrate is exposed to light and a mask is used to track the tracking lines.

In step (2) of the above method for improving transmittance of flat or curved liquid crystal display panel, the tracking lines are continuous straight lines.

In step (2) of the above method for improving transmittance of flat or curved liquid crystal display panel, the tracking lines are segmented lines.

In step (3) of the above method for improving transmittance of flat or curved liquid crystal display panel, while a direction of scanning and exposing a side of the CF substrate is parallel with the data line, the tracking lines are engraved on a region bounded by the data line after a cell process, and while the direction of scanning and exposing the side of the CF substrate is parallel with the gate line, the tracking lines are engraved on a region bounded by the gate line after a cell process.

In step (4) of the above method for improving transmittance of flat or curved liquid crystal display panel, after a first domain is exposed to light, the mask is translated by a distance of half length of one pixel and exposure of a second domain is started, so as to realize exposure of two domains of the CF substrate.

In the above method for improving transmittance of flat or curved liquid crystal display panel, the tracking lines have a width of 10 to 150 um.

In the above method for improving transmittance of flat or curved liquid crystal display panel, the tracking lines each have a length going through the substrate.

In the above method for improving transmittance of flat or curved liquid crystal display panel, there is/are 1 to 20 tracking lines.

In the above method for improving transmittance of flat or curved liquid crystal display panel, the tracking lines are outside pixel aperture regions.

In the above method for improving transmittance of flat or curved liquid crystal display panel, the tracking lines are made of an ITO or an IZO (Indium Zinc Oxide).

The present disclosure has the following beneficial effects.

The present disclosure, by taking advantage of a laser patterning method, overcomes the technical prejudices and enables the BPS technology to be compatible with the UV2A. technology. Besides, through this method, a satisfactory transmittance can also be obtained and especially, a desirable technical support can be provided for a curved liquid crystal display screen.

BRIEF DESCRIPTION OF DRAWINGS

The present disclosure will be illustrated in detail hereinafter with reference to the embodiments and the accompanying drawings. In the drawings.

Figure 1A:
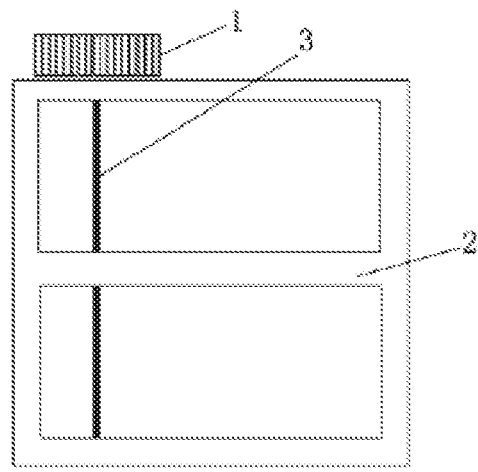
FIG. 1A shows a top view of a UV2A process in prior art.
Figure 1B:
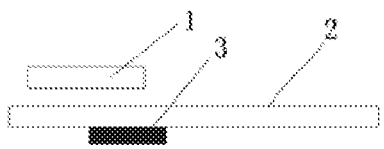
FIG. 1B shows a side view of the UV2A process in the prior art.
Figure 2A:
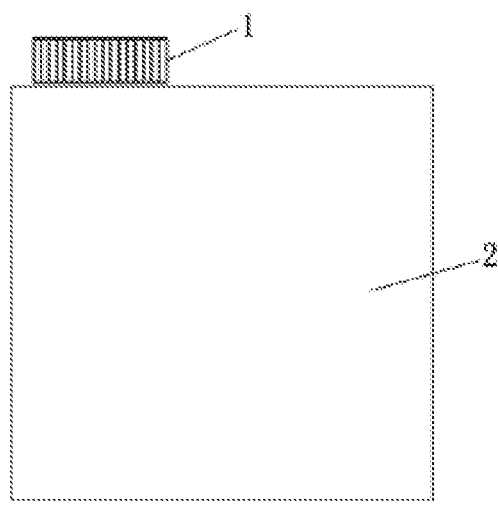
FIG. 2A shows a top view of a UV2A process when a BPS technology is adopted in the prior art.
Figure 2B:
FIG. 2B shows a side view of a UV2A process when the BPS technology is adopted in the prior art.

In the drawings, the same components are represented by the same reference signs, and the figures are not drawn to scale.

DETAILED DESCRIPTION OF THE EMBODIMENTS

The present disclosure will be illustrated further with reference to the drawings.

The present disclosure provides a method for improving transmittance of flat or curved liquid crystal display panel. The method mainly comprises the following steps.

(1) A substrate is manufactured according to the BPS technology. A PS and a BM of the substrate are provided on a side of an array substrate. A transparent conductive electrode (ITO or IZO) film is provided on a side of a CF substrate, which, to be noted, is a technical feature of the BPS technology.

(2) Marks are engraved on designated positions of the CF substrate by means of a laser. In addition to an active area, the marks can also be engraved on positions near edges of the substrate. The CF substrate is aligned with the marks on a platform of a UV2A exposure machine, so as to realize precise alignment. A cell process is then performed. It shall be noted that engraving marks can enable the CF substrate to be precisely aligned with the array substrate, which helps improving product yield.

Figure 3A:
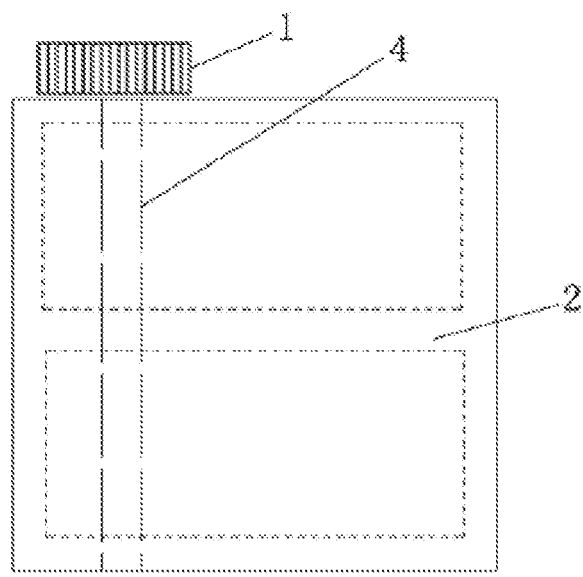
FIG. 3A shows a top view of an initial state of an ITO electrode before lines are engraved thereon by means of a laser in the present disclosure.
Figure 3B:
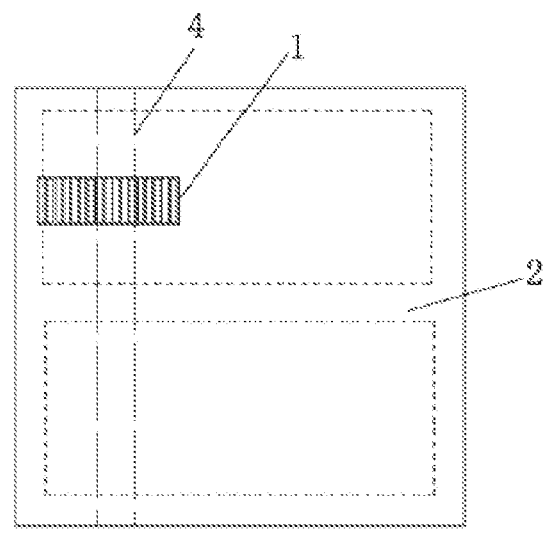
FIG. 3B shows a top view of the ITO electrode while lines are being engraved thereon by means of a laser in the present disclosure.

(3) As shown in FIG. 3A and FIG. 3B, straight lines are engraved on designated positions of the ITO electrode by means of a laser. A region bounded by the straight lines (i.e., ITO tracking lines 4) needs to be aligned with a light-shielding region of a gate line 6 or a light-shielding region of a data line 5 on a side of the array substrate.

Figure 4A:
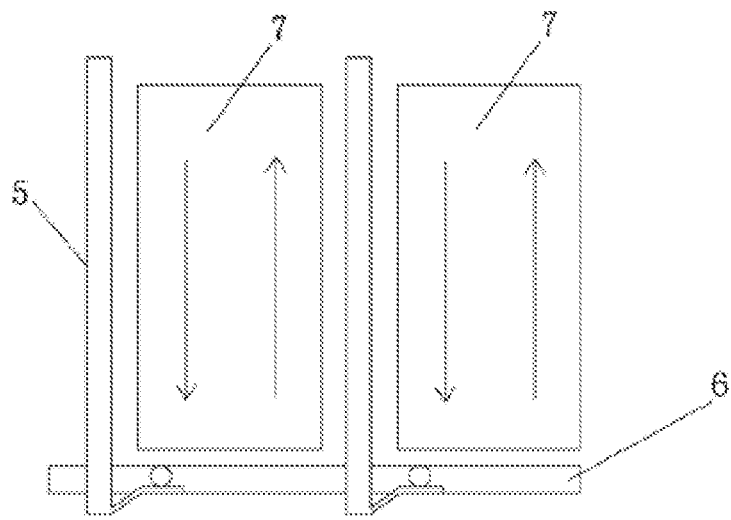
FIG. 4A schematically shows scanning and exposing of a side of a CF substrate in a direction parallel to a data line.
Figure 4B:
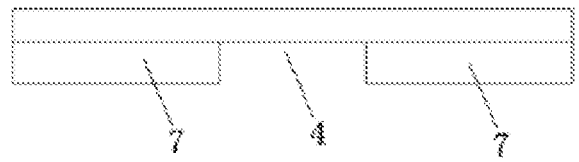
FIG. 4B schematically shows the ITO electrode and ITO tracking lines.
Figure 4C:
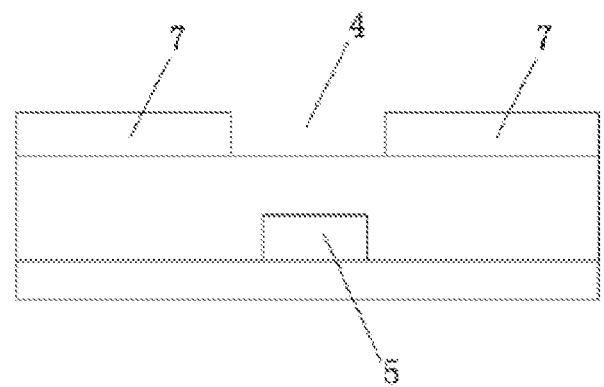
FIG. 4C schematically shows aligning of ITO tracking lines and the data line.
Figure 5A:
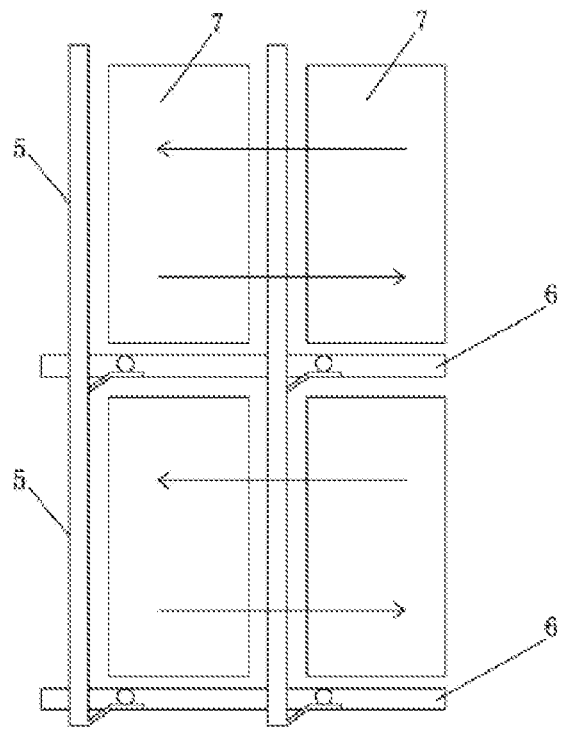
FIG. 5A schematically shows scanning and exposing of a side of a CF substrate and in a direction parallel to a gate line.
Figure 5B:
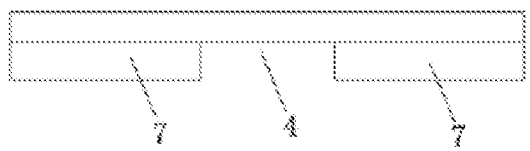
FIG. 5B schematically shows the ITO electrode and ITO tracking lines.
Figure 5C:
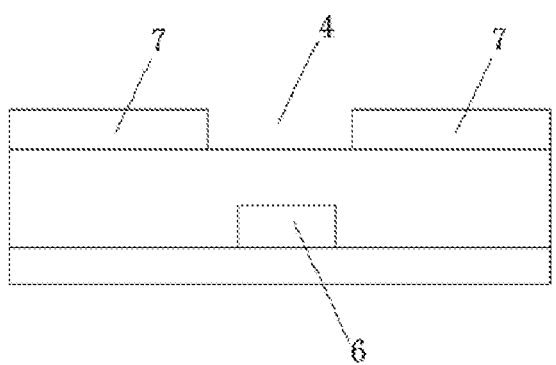
FIG. 5C schematically shows aligning of ITO tracking lines and the gate line.

It shall be noted that, when a direction of scanning and exposing the side of the CF substrate is parallel with the data line 5, the ITO tracking lines 4, after the cell process, are engraved on a region bounded by the data line (as shown in FIG. 4A, FIG. 4B, and FIG. 4C); when the direction of scanning and exposing the side of the CF substrate is parallel with the gate line 6, the ITO tracking lines 4, after the cell process, are engraved on a region bounded by the gate line (as shown in FIG. 5A, FIG. 5B, and FIG. 5C). The foregoing condition shall be met during the manufacturing process.

Preferably, to ensure conductivity of the entire transparent conductive electrode (ITO or IZO) on the CF substrate, segmented lines shall be engraved on the transparent conductive electrode (e.g. ITO). It shall be noted that, while the ITO tracking lines 4 formed are continuous straight lines or segmented lines, domain exposures achieved by means of them are different in terms of precision. A specific choice can be made according to product demands. To realize optimal conductivity of the entire transparent conductive electrode (ITO or IZO) on the CF substrate, each segment of the ITO tracking lines 4 has a length larger than or equal to a length of a space between two adjacent segments.

It shall be noted that, when the ITO or IZO tracking lines are continuous straight lines, exposure precision achieved by means of them is not as good as the exposure precision achieved by means of segmented lines. However, when the ITO or IZO tracking lines are continuous straight lines, the domain exposure precision achieved by means of these tracking lines can still satisfy general requirements.

Preferably, the ITO tracking lines, which are continuous straight lines or segmented lines, each have a width of 10 to 150 um and each have a length going through the substrate. Besides, preferably, there is/are 1 to 20 tracking lines. However, the number of the tracking lines is not limited by the above.

Preferably, after the cell is formed, the ITO tracking lines are aligned with the gate line 6 or the data line 5 on the side of the array substrate. Besides, the ITO tracking lines are located outside pixel aperture regions, and therefore do not affect image forming effects.

Figure 6A:
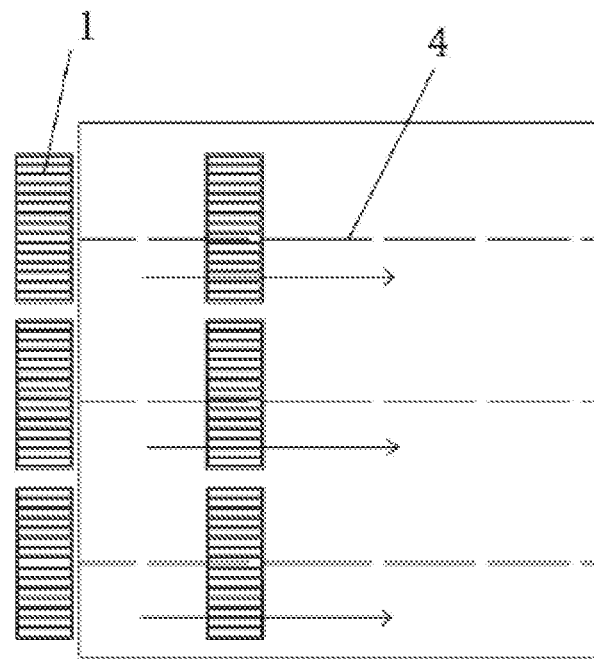
FIG. 6A shows a diagram of the ITO tracking lines engraved with a laser being tracked by means of a mask during an exposure process.
Figure 6B:
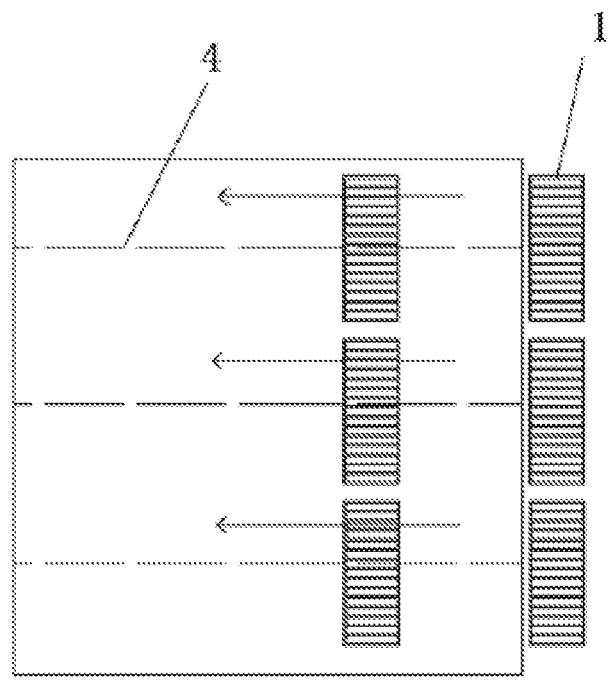
FIG. 6B shows another diagram of the ITO tracking lines engraved with a laser being tracked by means of a mask during an exposure process.

(4) As shown in FIG. 6A and FIG. 6B, during the exposure, a mask 1 is used to track the ITO tracking lines engraved by means of a laser. After a first domain is exposed to light, the mask 1 is translated by a distance of half length of one pixel and exposure of a second domain is started, by way of which two domains of the CF substrate are exposed.

Specifically, the distance by which the mask 1 is translated is (2n+1)*0.5P. P stands for a length of one pixel and n can be an integer from 0, 1, 2 . . . In other words, exposure of the two domains of the CF substrate can be realized by way of translating the mask 1 by a distance (2n+1) times of half length of one pixel and then starting exposing a second domain.

In conclusion, the present disclosure provides a method for improving transmittance of flat or curved liquid crystal display panel. The method, by taking advantage of a laser patterning method, overcomes the technical prejudices and enables the BPS technology to he compatible with the UV2A technology. Besides, through this method, a satisfactory transmittance can be obtained and especially, a desirable technical support can be provided for a curved liquid crystal display screen.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A method for improving transmittance of flat or curved liquid crystal display panel, comprising the following steps:
   (1) manufacturing a substrate according to black photo spacer technology, the substrate comprising an array substrate and a color filter substrate, wherein a spacer and a black matrix are provided on a side of the array substrate, and a transparent conductive electrode film is provided on a side of the color filter substrate;
   (2) engraving marks on designated positions of the color filter substrate by means of a laser and aligning the color filter substrate with the marks on a platform of a UV2A exposure machine;
   (3) engraving tracking lines on the transparent conductive electrode film, a region bounded by the tracking lines being aligned with a light-shielding region of a gate line or a light-shielding region of a data line on the side of the array substrate; and
   (4) exposing the substrate to light and using a mask to track the tracking lines.

2. The method for improving transmittance of flat or curved liquid crystal display panel according to claim 1, wherein in step (3), the tracking lines are continuous straight lines.

3. The method for improving transmittance of flat or curved liquid crystal display panel according to claim 1, wherein in step (3), the tracking lines are segmented lines.

4. The method for improving transmittance of flat or curved liquid crystal display panel according to claim 1, wherein in step (3), while a direction of scanning and exposing a side of the color filter substrate is parallel with the data line, the tracking lines are engraved on a region bounded by the data line after a cell process, and while a direction of scanning and exposing a side of the color filter substrate is parallel with the gate line, the tracking lines are engraved on a region hounded by the gate line after a cell process.

5. The method for improving transmittance of flat or curved liquid crystal display panel according to claim 1, wherein in step (4), after a first domain is exposed to light, the mask is translated by a distance of half length of one pixel and exposure of a second domain is started, so as to realize exposure of two domains of the color filter substrate.

6. The method for improving transmittance of flat or curved liquid crystal display panel according to claim 1, wherein the tracking lines each have a width of 10 to 150 um.

7. The method for improving transmittance of flat or curved liquid crystal display panel according to claim 1, wherein the tracking lines each have a length going through the substrate.

8. The method for improving transmittance of flat or curved liquid crystal display panel according to claim 1, wherein there is/are 1 to 20 tracking lines.

9. The method for improving transmittance of flat or curved liquid crystal display panel according to claim 1, wherein the tracking lines are outside pixel aperture regions.

10. The method for improving transmittance of flat or curved liquid crystal display panel according to claim 1, wherein the tracking lines are made of an indium tin oxide or an indium zinc oxide.

* * * * *